(12) United States Patent
Guo et al.

(10) Patent No.: US 11,929,521 B2
(45) Date of Patent: *Mar. 12, 2024

(54) RECHARGEABLE BATTERY

(71) Applicant: Contemporary Amperex Technology Co., Limited, Ningde (CN)

(72) Inventors: Zhijun Guo, Ningde (CN); Jie Zhang, Ningde (CN); Peng Wang, Ningde (CN); Taosheng Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 473 days.

This patent is subject to a terminal disclaimer.

(21) Appl. No.: 17/024,732

(22) Filed: Sep. 18, 2020

(65) Prior Publication Data
US 2021/0005867 A1    Jan. 7, 2021

Related U.S. Application Data

(62) Division of application No. 15/978,447, filed on May 14, 2018, now Pat. No. 10,826,047.

(30) Foreign Application Priority Data

Jan. 16, 2018    (CN) .......................... 201810039814.4

(51) Int. Cl.
*H01M 50/538*    (2021.01)
*H01M 50/533*    (2021.01)

(52) U.S. Cl.
CPC ....... *H01M 50/538* (2021.01); *H01M 50/533* (2021.01)

(58) Field of Classification Search
None
See application file for complete search history.

(56) References Cited

U.S. PATENT DOCUMENTS

2010/0323239 A1    12/2010    Kim
2012/0189907 A1    7/2012    Kim et al.
(Continued)

FOREIGN PATENT DOCUMENTS

CN    102751527 A    10/2012
CN    103296241 A    9/2013
(Continued)

OTHER PUBLICATIONS

The First Office Action for Chinese Application No. 201810039814.4, dated Jun. 14, 2019, 10 pages.
(Continued)

*Primary Examiner* — Basia A Ridley
*Assistant Examiner* — Heng M. Chan
(74) *Attorney, Agent, or Firm* — East IP P.C.

(57) ABSTRACT

The present disclosure provides a rechargeable battery, including an electrode assembly and a connecting member. The electrode assembly includes an electrode assembly body and an electrode tab extending from an end surface of the electrode assembly body. The connecting member includes a guiding plate, a first connecting plate and a second connecting plate respectively connected to the guiding plate. The first connecting plate, the second connecting plate and the guiding plate extend along a width direction. The electrode tab is bent with respect to a longitudinal direction to form a bending part and the bending part of the electrode tab is connected to the first connecting plate. The width direction is to a thickness direction of the rechargeable battery.

12 Claims, 13 Drawing Sheets

(56) References Cited

U.S. PATENT DOCUMENTS

| | | | |
|---|---|---|---|
| 2012/0270099 | A1 | 10/2012 | Lee et al. |
| 2013/0330593 | A1 | 12/2013 | Kim et al. |
| 2015/0111090 | A1 | 4/2015 | Lee et al. |
| 2017/0125778 | A1 | 5/2017 | Iwasa et al. |
| 2017/0170445 | A1 | 6/2017 | Kim et al. |
| 2018/0040918 | A1* | 2/2018 | Guen ................ H01M 50/176 |
| 2019/0019633 | A1* | 1/2019 | Ito ........................ H01G 11/70 |
| 2019/0067665 | A1* | 2/2019 | Jang ................... H01M 50/186 |

FOREIGN PATENT DOCUMENTS

| | | |
|---|---|---|
| CN | 103490039 A | 1/2014 |
| CN | 204029909 U | 12/2014 |
| CN | 106165152 A | 11/2016 |
| CN | 206574809 U | 10/2017 |
| EP | 2482366 A1 | 8/2012 |
| EP | 2515362 A2 | 10/2012 |
| EP | 2793292 A2 | 10/2014 |
| JP | 2002100340 A | 4/2002 |
| WO | 2012176704 A1 | 12/2012 |
| WO | WO-2017131168 A1 * 8/2017 ............. H01G 11/28 |

OTHER PUBLICATIONS

The extended European search report for EP Application No. 18171215.9, dated Nov. 22, 2018, 34 pages.
The First Office Action for American U.S. Appl. No. 15/978,447, dated Sep. 27, 2019, 20 pages.
The second Office Action and search report dated Jan. 15, 2020 for Chinese Application No. 201810039814.4, 9 pages.

* cited by examiner

RECHARGEABLE BATTERY

CROSS-REFERENCE TO RELATED APPLICATION

This application is a divisional application of U.S. patent application Ser. No. 15/978,447, filed on May 14, 2018, which claims priority to Chinese Patent Application No. 201810039814.4, filed on Jan. 16, 2018, both of which are incorporated herein by reference in their entireties.

FIELD

The present disclosure relates to the technical field of batteries and, in particular, to a rechargeable battery.

BACKGROUND

In a square rechargeable battery in the prior art, an electrode tab of an electrode assembly is connected to a connection member. A first connecting plate of the connection member connected to the electrode assembly is generally parallel to a longitudinal direction of the electrode assembly. As the market continues to expand, a high-current battery is more and more desirable. In order to meet the requirement against overflow and temperature-rise requirements of the battery, it needs to be guaranteed that there is a sufficient welding area between the first connecting plate and the electrode tab, so that the first connecting plate must have a sufficient size in the longitudinal direction of the electrode assembly, which will inevitably take up much more space, leading to a low space utilization of the electrode assembly and a low energy density.

SUMMARY

The object of the present disclosure is to provide a rechargeable battery, aimed at improving the energy density of the rechargeable battery.

The present disclosure provides a rechargeable battery, including an electrode assembly and a connecting member. The electrode assembly includes an electrode assembly body and an electrode tab extending from an end surface of the electrode assembly body. The connecting member includes a guiding plate, a first connecting plate and a second connecting plate respectively connected to the guiding plate. The first connecting plate, the second connecting plate and the guiding plate extend along a width direction. The electrode tab is bent with respect to a longitudinal direction to form a bending part and the bending part of the electrode tab is connected to the first connecting plate. The width direction is to a thickness direction of the rechargeable battery.

Further features and advantages of the present disclosure will be clear from the following detailed description of exemplary embodiments of the present disclosure with reference to the accompanying drawings.

BRIEF DESCRIPTION OF THE DRAWINGS

The drawings described herein are used to provide a further illustration for the present disclosure and form a part of the present disclosure. The schematic embodiments and the descriptions of the present disclosure are used to explain the present disclosure and do not constitute improper a limitation to the present disclosure. In the drawings.

DETAILED DESCRIPTION

Figure 1:
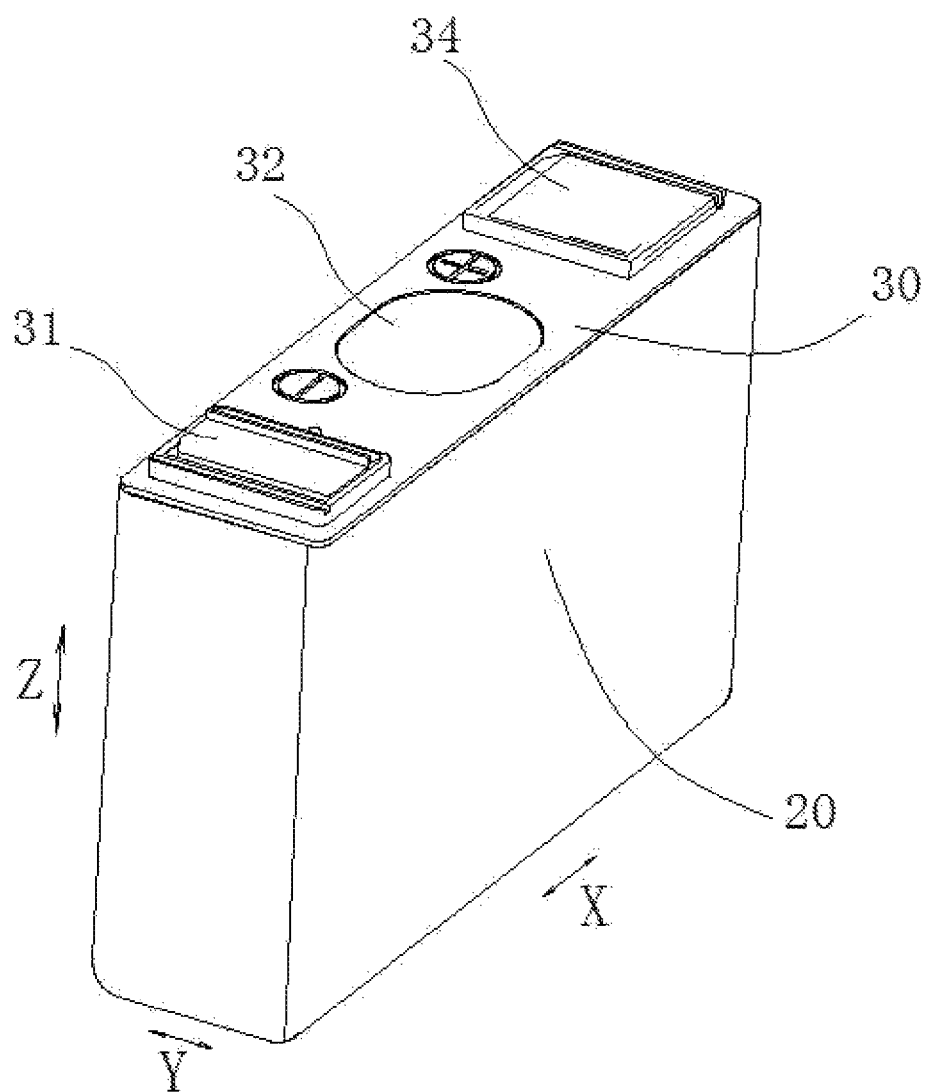
FIG. 1 is a three-dimensional schematic structural diagram of a rechargeable battery according to an embodiment of the present disclosure.

The technical solutions in the embodiments of the present disclosure are clearly and completely described below with reference to the accompanying drawings. The described embodiments are merely exemplary embodiments of the present disclosure, rather than all of the embodiments of the present disclosure. The following description of at least one exemplary embodiment is merely illustrative and not intended to provide any limitation on the present disclosure or its application or use. All other embodiments obtained by those skilled in the art without creative efforts according to the embodiments of the present disclosure are within the scope of the present disclosure.

Unless otherwise specified, the relative arrangement of the components and steps, the numerical expressions, and the numerical values set forth in these embodiments do not limit the scope of the present disclosure. In the meantime, it should be understood that, for ease of description, the dimensions of parts shown in the accompanying drawings are not based on the actual scale. Techniques, methods, and devices known to those skilled in the art may not be described in detail but, where appropriate, the techniques, methods, and devices should be considered parts of the specification. In all of the examples shown and described herein, any specific value should be interpreted as merely illustrative and not as a limitation. Therefore, other examples of the exemplary embodiments may have different values. It should be noted that, similar reference numbers and letters designate similar items in the following accompanying drawings, and therefore, once an item is defined in the description of one figure, it will not be further described in description of the subsequent figures.

In the description of the present disclosure, it should be understood that, the terms "first", "second" and the like are used to define components merely for ease of distinguishing the corresponding components. Unless otherwise specified, the above terms do not have specific meanings and therefore cannot be understood as a limitation on the protection scope of the present disclosure.

In the description of the present disclosure, it should be understood that, the positions or positional relationships which the locality terms such as "front, rear, above, under, left, right", "lateral, longitudinal, vertical, horizontal" and "top, bottom" and the like indicate are generally based on the orientations or positional relationships shown in the accompanying drawings, merely for ease of describing the application and simplifying the description, and therefore, unless otherwise stated, such orientation terms do not indicate or imply that the referred apparatus or element must have a specific orientation or be constructed and operated in a specific orientation, and thus cannot be understood as a limitation on the protection scope of the present disclosure. The term "inside, outside" refers to the inside and outside with respect to the profile of each component.

In the description of the present disclosure, the "longitudinal direction" refers to the longitudinal direction of an electrode assembly 100, corresponding to the direction X in FIG. 1, the "width direction" refers to the thickness direction of the rechargeable battery, corresponding to the direction Y in FIG. 1, and the "height direction" refers to a direction perpendicular to the longitudinal direction and the width direction, corresponding to the direction Z in FIG. 1.

FIGS. 1-21 show structures of a rechargeable battery and its components according to the embodiments of the present disclosure.

As shown in FIGS. 1-21, a rechargeable battery in the embodiments of the present disclosure includes an electrode assembly 100 and a connecting member 35. The electrode assembly 100 includes an electrode assembly body 110 and an electrode tab 120 extending from the electrode assembly body 110. The connecting member 35 includes a guiding plate 353, a first connecting plate 351 and a second connecting plate 352 connected to the guiding plate 353. The guiding plate 353 extends along a width direction Y. The first connecting plate 351 extends away from the guiding plate 353 in the width direction Y. The electrode tab 120 is bent with respect to a longitudinal direction X and is connected to the first connecting plate 351. At least a part of the guiding plate 353 protrudes toward the electrode assembly body 110 with respect to the first connecting plate 351 to form a protrusion, which abuts against the electrode assembly 100.

Compared with the prior art in which the first connecting plate is parallel to the longitudinal direction of the electrode assembly, in the rechargeable battery of the embodiments of the present disclosure, since the first connecting plate extends away from the guiding plate 353 in the width direction Y, and the electrode tab 120 is bent with respect to the longitudinal direction X and is connected to the first connecting plate 351, space occupied by the first connecting plate 351 and the electrode tab 120 in the longitudinal direction X can be decreased and the space utilization of the electrode assembly 100 can be increased, thereby improving the energy density of the rechargeable battery.

If the first connecting plate and the guiding plate of the connecting member are in a same plane, the positioning and fixation of the electrode assembly along the longitudinal direction is achieved by applying a force to an unbent portion of the electrode tab. A force applied to the connecting member will be passed directly to the unbent portion of the electrode tab. Then, when the rechargeable battery vibrates or is impacted, the electrode tab 120 is prone to be ruptured. In the embodiments of the present disclosure, since at least a part of the guiding plate 353 protrudes toward the electrode assembly body 110 with respect to the first connecting plate 351 to form a protrusion, which abuts against the electrode assembly 100, when the rechargeable battery vibrates or is impacted, the guiding plate 353 will bear most of the force, so as to effectively alleviate the rupture of the electrode tab 120 caused by the vibration or impact.

At the same time, the electrode tab is formed by stacking a plurality of sheet structures. A thickness of a sheet structure is very small, which has a limited support strength when being applied with a force. If the first connecting plate and the guiding plate of the connecting member are in a same plane, when the rechargeable battery vibrates or is impacted, the sheet structure of the electrode tab has a possibility of being inserted into the electrode assembly body, so that there is a potential risk of the short circuit occurring inside the battery. In an embodiment of the present disclosure, the movable range of the electrode tab 120 is effectively decreased since the guiding plate 353 has a protrusion toward the electrode assembly body 110 and the protrusion abuts against the electrode assembly 100, and a possibility of the electrode tab 120 being inserted into the electrode assembly body 110 after being pressed is effectively decreased, thereby reducing the risk of the short circuit occurring inside the battery.

Since the possibility of electrode tab 120 being pulled apart and the possibility of the electrode tab being inserted into the interior electrode assembly body 110 are both decreased, the service life and safety performance of the electrode assembly 100 can be improved.

The embodiments of the present disclosure will be described in detail in the following with reference to FIGS. 1-21.

As shown in FIG. 1, the rechargeable battery includes a case 20, a top cover 30, an electrode assembly 100, and a connecting member 35. The case 20 and the top cover 30 form installation space, inside which a portion of the electrode assembly 100 and the connecting member 35 located under the top cover 30 is located, and the connecting member 35 is connected to an electrode part on the top cover 30. As shown in FIG. 1, there is an explosion-proof valve 32, a positive electrode part 31, and a negative electrode part 34 provided on the top cover 30.

The connecting member 35 of the rechargeable battery can be fixedly connected to the top cover 30 and the electrode part thereon, and then can be connected to the electrode assembly 100. Then, the portion of the connecting member 35 located under the top cover 30 and the electrode assembly 100 are together accommodated inside the case 20. After the connecting member 35 and the electrode assembly 100 are assembled, the top cover 30 exactly covers an opening of the case 20, and then the top cover 30 and the case 20 are connected and sealed.

The electrode assembly 100 includes an electrode assembly body 110 and an electrode tab 120 extending from the electrode assembly body 110. The electrode assembly 100 is a square electrode assembly formed by winding a positive electrode plate, a separator, and a negative electrode plate. A width direction of the positive electrode tab, the separator and the negative electrode tab forms a longitudinal direction X of the electrode assembly 100.

The positive plate and the negative plate each include a substrate and an active material coated on the substrate. An area coated with the active material on the substrate forms a coated area. The separator is used to isolate the positive electrode plate from the negative electrode plate so as to avoid a short circuit occurring inside the rechargeable battery. The substrate of the positive electrode plate may be a first metal foil such as an aluminum foil. The substrate of the negative electrode plate may be a second metal foil such as a copper foil.

The electrode assembly 100 includes a positive electrode tab and a negative electrode tab. The positive electrode tab is formed by a portion of a side edge of the first metal foil that is not coated with the active material. The negative electrode tab is formed by a portion of a side edge of the second metal foil that is not coated with the active material. In some embodiments, the positive electrode tab and the negative electrode tab are located at two ends of the electrode assembly 100 in the longitudinal direction X and protrude from corresponding ends of the separator.

Figure 2:
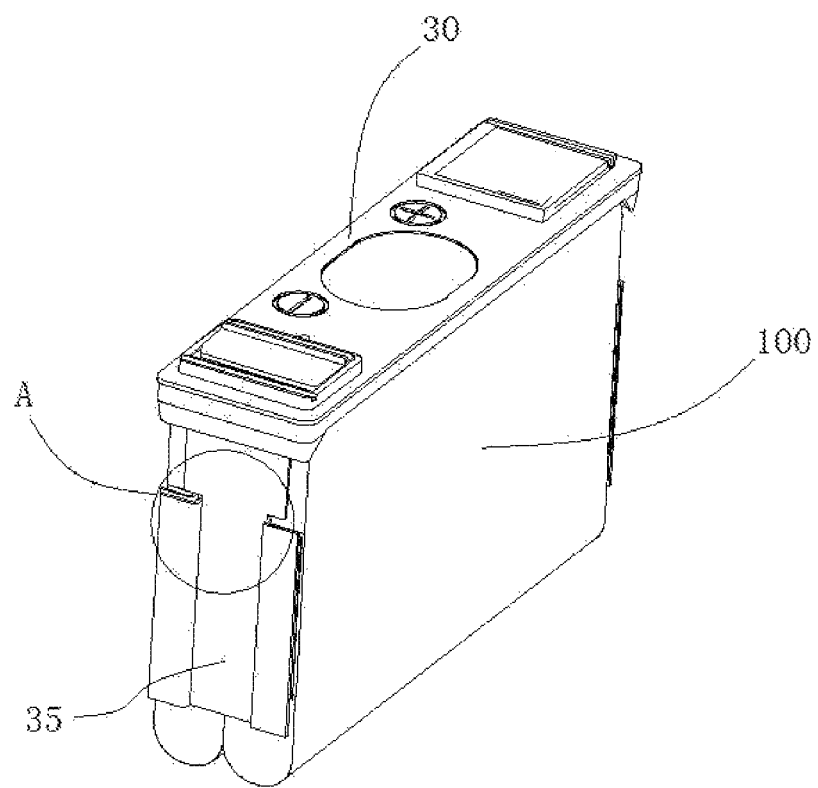
FIG. 2 is a three-dimensional schematic structural diagram of the rechargeable battery shown in FIG. 1 after a case of the rechargeable battery is removed.

As shown in FIG. 2, the connecting member 35 is located at an end of the electrode assembly 100 in the longitudinal direction X. In some embodiments, there is one connecting member 35 provided at each of the two ends of the electrode assembly 100. One connecting member 35 is connected to the positive electrode tab of the electrode assembly 100 and the other connecting member 35 is connected to the negative electrode tab of the electrode assembly 100. The connecting member 35 connected to the positive electrode tab of the electrode assembly 100 is connected to the positive electrode part 31, and the connecting member 35 connected to the negative electrode tab of the electrode assembly 100 is connected to the negative electrode part 34.

The connecting members 35 disposed at the two ends of the electrode assembly 100 are connected to the electrode tabs on two corresponding ends in a same manner. Therefore, as an example, the following description merely illustrates one connecting member 35 disposed at one end of the electrode assembly 100 in the longitudinal direction X as well as the connection manner between this connecting member 35 and the electrode assembly 100.

The connecting member 35 includes a guiding plate 353, a first connecting plate 351 connected to the guiding plate 353, and a second connecting plate 352 connected to an upper portion of the guiding plate 353. The first connecting plate 351 is electrically connected to the electrode tab 120. The second connecting plate 352 is located above the electrode assembly 100 and is bent toward one side of the electrode assembly 100.

The second connecting plate 352 can serve as the electrode part of the rechargeable battery or can be electrically connected to the electrode part of the rechargeable battery, so as to be electrically connected to the outside of the rechargeable battery. In some embodiments, the second connecting plate 352 is electrically connected to the electrode part. Specifically, the second connecting plate 352 may be connected to the electrode part by a connection hole provided in the second connecting plate 352.

As shown in FIGS. 2-5, the guiding plate 353 extends along the width direction Y. The first connecting plate 351 is located on an external side of the guiding plate 353 in the width direction Y and is perpendicular to the longitudinal direction X. The guiding plate 353 includes a protrusion that protrudes toward the electrode assembly body 110 with respect to the first connecting plate 351.

Figure 3:
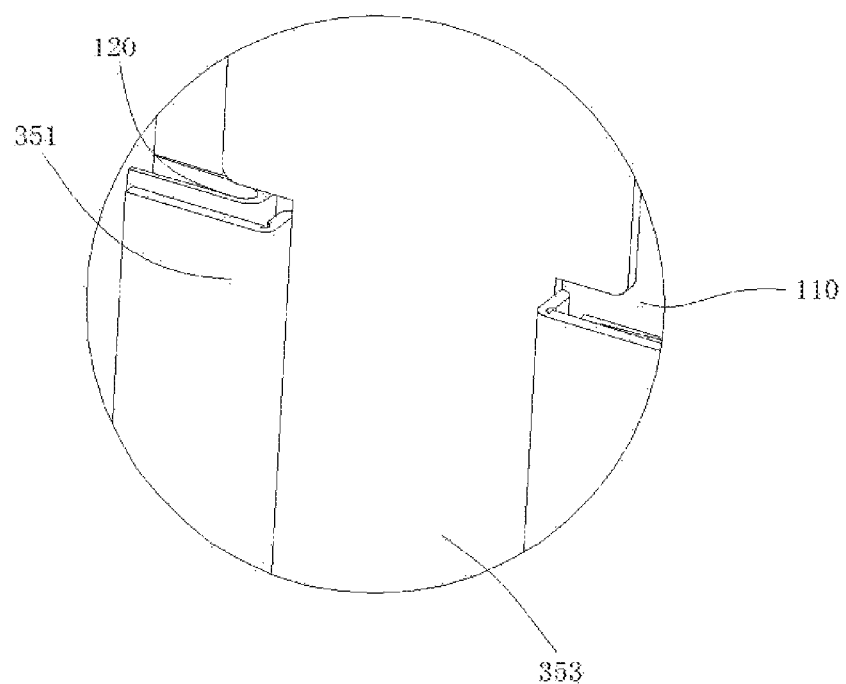
FIG. 3 is an enlarged view of part A of FIG. 2.
Figure 4:
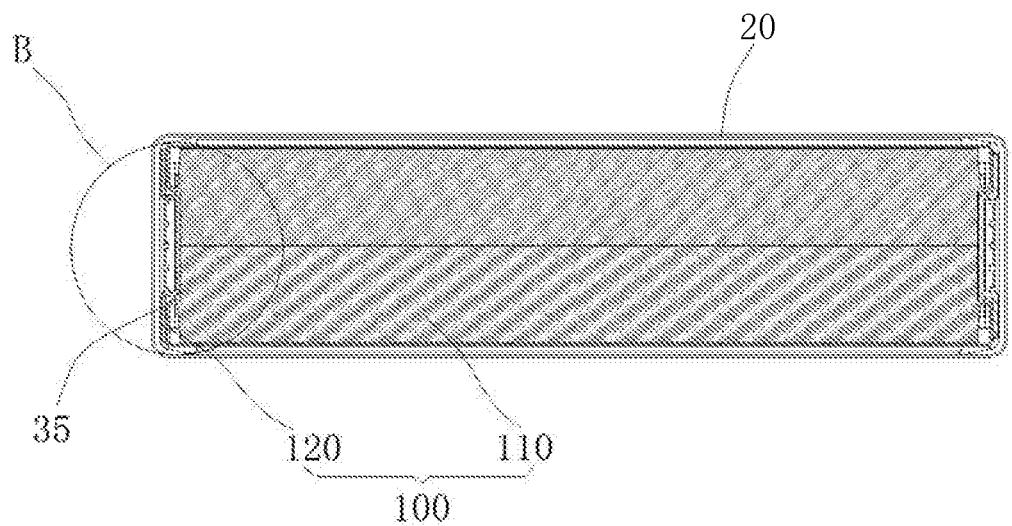
FIG. 4 is a structural cross-sectional diagram of the rechargeable battery shown in FIG. 2.

In some embodiments, as shown in FIGS. 3-4, the protrusion of the guiding plate 353 is attached to the electrode assembly 100. In some embodiments, the guiding plate 353 is entirely attached to the end surface of the electrode assembly body 110. In this way, the electrode tab 120 is less likely to be damaged or inserted into the electrode assembly body 110 when the rechargeable battery vibrates or is impacted, thereby further improving the service life and safety performance of the electrode assembly 100.

The connecting member 35 is integrally made by a sheet material. In some embodiments, after the guiding plate 353 is positioned relative to the electrode assembly 100, the first connecting plate 351 may be fixedly connected to the electrode tab 120 in a state where the first connecting plate 351 is parallel to the longitudinal direction X, and then the first connecting plate 351 is bent outward with respect to the guiding plate 353 so as to complete installation of the connecting member 35 and the electrode assembly 100. As shown in FIGS. 2-5, after the installation is completed, at least a part of the electrode tab 120 is located between the first connecting plate 351 and the electrode assembly body 110.

In some embodiments (not shown), after the position of the guiding plate 353 relative to the electrode assembly 100 is determined, the first connecting plate 351 can be fixedly connected to the electrode tab 120 in a state where the first connecting plate 351 deviates from the longitudinal direction X at a certain angle, and then the first connecting plate 351 is bent outward with respect to the guiding plate 353 so as to complete installation of the connecting member 35 and the electrode assembly 100.

With the above-mentioned installation manners, after the position of the guiding plate 353 relative to the electrode assembly 100 is determined, the first connecting plate 351 is fixedly connected to the electrode tab 120 in a state where the first connecting plate 351 has a certain angle with respect to the end surface of the electrode assembly body 110, and then the first connecting plate 351 is bent outward with respect to the guiding plate 353. When the first connecting plate 351 is connected to the electrode tab 120, there is large operation space and it is easy to fixedly connect the electrode tab 120 with the first connecting plate 110, thereby guaranteeing the connection quality between the electrode tab 120 and the first connecting plate 351.

As shown in FIGS. 2-8, the protrusion includes a main plate body 3531 and a flanging portion 3532. The flanging portion 3532 is located at a lateral edge of the main plate body 3531 and extends in a direction away from the electrode assembly 100. The first connecting plate 351 is connected to the main plate body 3531 through the flanging portion 3532. In this way, the guiding plate 353 forms a stepped structure toward the electrode assembly body 110 with respect to the first connecting plate 351. The main plate body 3531 is a flat plate.

In the embodiments shown in FIGS. 2-8, the flanging portion 3532 is perpendicular to the main plate body 3531. In other embodiments (not shown), the flanging portion 3532 can tilt toward an inner side of the main plate body 3531, or the flanging portion 3532 can also tilt toward an outer side of the main plate body 3531.

As shown in FIGS. 2-5 and FIG. 8, the first connecting plate 351 is parallel to the main plate body 3531. In this case, both the first connecting plate 351 and the main plate body 3531 are perpendicular to the longitudinal direction X of the electrode assembly 100.

As shown in FIGS. 3-8, there is a notch 35A between the first connecting plate 351 and the guiding plate 353. The notch 35A leads to a weak portion formed between the first connecting plate 351 and the guiding plate 353, and leads to an accurate bending position when the first connecting plate 351 is bent with respect to the guiding plate 353, thereby resulting in an accurate size for the connecting member 35 after being bent and facilitating installation of the rechargeable battery. Moreover, the notch 35A makes the first connecting plate 351 be more easily bent, so as to reduce the possible damage to the electrode assembly 100 and the electrode tab 120 caused by the bending.

Figure 9:
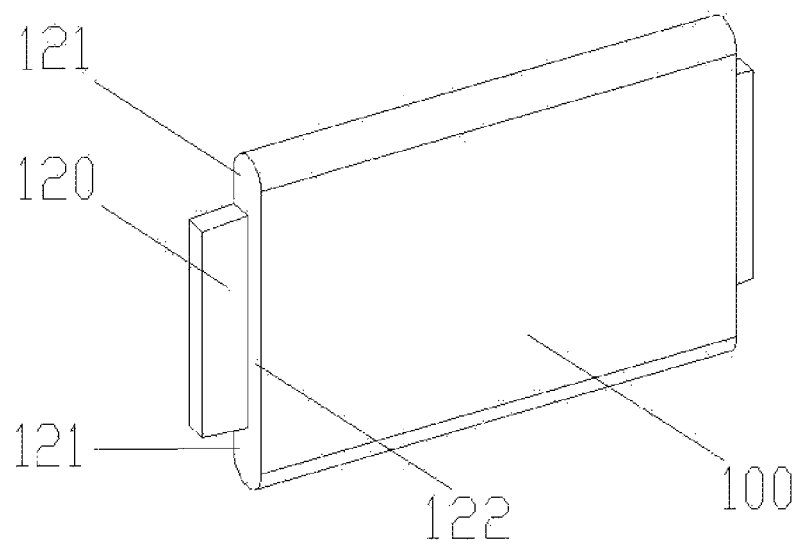
FIG. 9 is a structural schematic diagram of an electrode assembly of a rechargeable battery according to an embodiment of the present disclosure.
Figure 10:
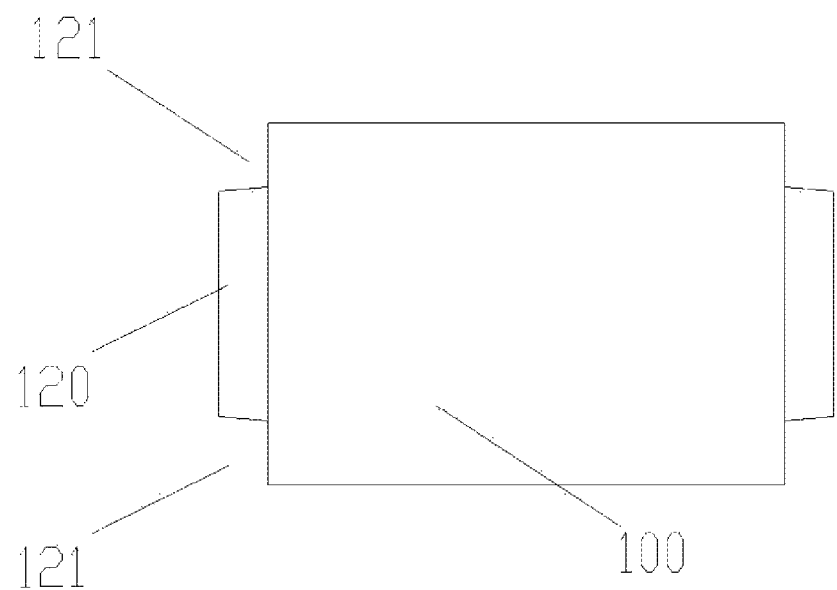
FIG. 10 is a front view of the electrode assembly shown in FIG. 9.
Figure 11:
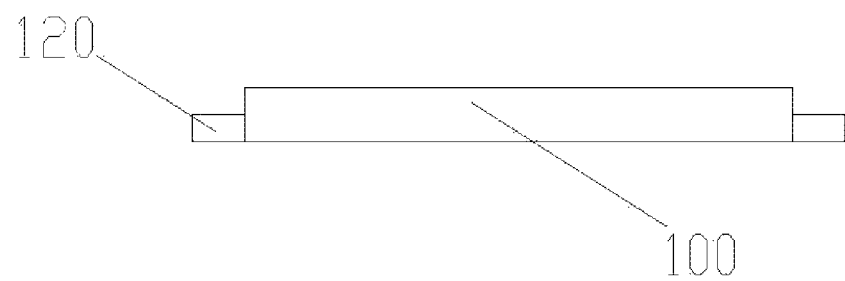
FIG. 11 is a bottom view of the electrode assembly shown in FIG. 9.

As shown in FIGS. 9-11, in some embodiments, the electrode tab 120 extends from a portion of the electrode assembly body 110 in the thickness direction. As shown in FIG. 9, the electrode tab 120 extends from a rear portion of the electrode assembly 100 in the thickness direction, and the electrode tab 120 does not extend from a front portion of the electrode assembly 100 in the thickness direction, so that a first vacancy portion 122 is formed in the width direction. In this way, after the first connecting plate 351 is bent outward with respect to the guiding plate 353, the thickness occupied by the electrode tab 120 in the longitudinal direction X is decreased, so that the first connecting plate 351 can be disposed closer to the electrode assembly body 110 and the overall size in the longitudinal direction X of the connecting member 35 and the electrode assembly 100 can be further decreased, which further improves the energy density of the rechargeable battery. Moreover, the electrode assembly body 110 can be disposed closer to the first connecting plate 351, and the movable space of the electrode tab 120 can be further decreased, thereby facilitating preventing the electrode tab 120 from being damaged and preventing the electrode tab 120 from being inserted into the electrode assembly body 110 to cause a short circuit occurring inside the rechargeable battery.

In some embodiments, the electrode tab 120 includes a positive electrode tab and a negative electrode tab respectively disposed at two ends of the electrode assembly body 110 in the length direction (i.e., the longitudinal direction X in the rechargeable battery). Preferably, positions at which the positive electrode tab and the negative electrode tab are distributed in the thickness direction (i.e., the width direction Y in the rechargeable battery) are the same.

As shown in FIG. 11, the electrode tab 120 is disposed on one side of the electrode assembly body 110 in the thickness direction. In some embodiments, the electrode tab 120 is disposed on a side of a split of the electrode assembly body 110 in the thickness direction.

As shown in FIG. 9 and FIG. 10, the electrode tab 120 is located in the middle portion of the electrode assembly body 110 in the height direction (i.e., the height direction Z in the rechargeable battery). As shown in FIG. 10, in the height direction of the electrode assembly body 110, a second vacancy portion 121 is formed above and below the electrode tab 120. In this way, the electrode tab 120 is more easily to be bent, so that the electrode tab 120 is located between the first connecting plate 351 and the electrode assembly body 110.

As shown in FIGS. 2-5, the connecting member 35 includes two first connecting plates 351 disposed on two sides of the guiding plate 353. The rechargeable battery includes two electrode assemblies 100 arranged side by side. The electrode tabs 120 of the two electrode assemblies 100 with the same polarity are respectively connected to two first connecting plates 351. In some embodiments, two electrode assemblies 100 are symmetrically arranged.

In some embodiments, the electrode tab 120 is disposed at a side of the electrode assembly body 110 in the thickness direction (the width direction Y of the rechargeable battery). A position where the electrode tab 120 of one electrode assembly 100 extends from the electrode assembly body 110 is away from the other electrode assembly 100, that is, a position where the electrode tab 120 extends from the electrode assembly body 110 is at an outer side of the rechargeable battery in the width direction Y.

Figure 5:
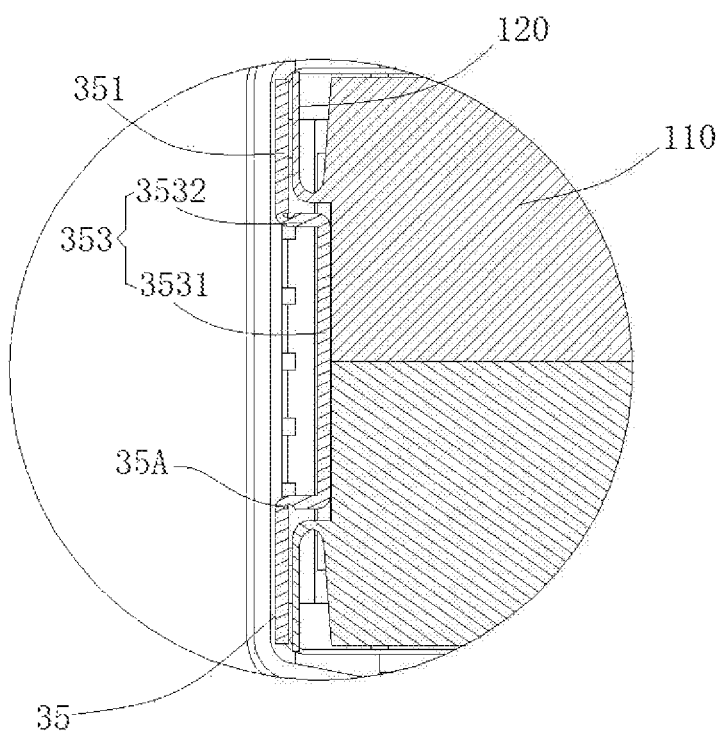
FIG. 5 is an enlarged view of part B of FIG. 4.
Figure 6:
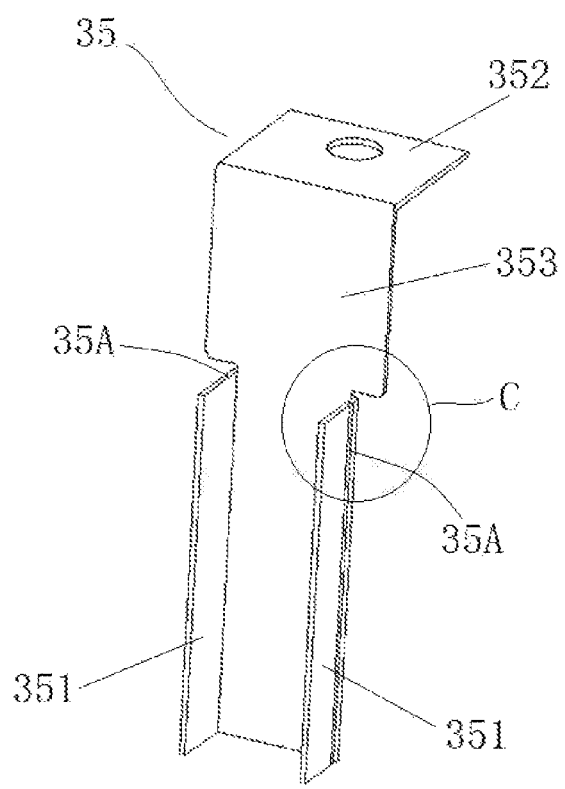
FIG. 6 is a structural schematic view of a connecting member of a rechargeable battery before a first connecting plate is bent with respect to a guiding plate according to an embodiment of the present disclosure.
Figure 7:
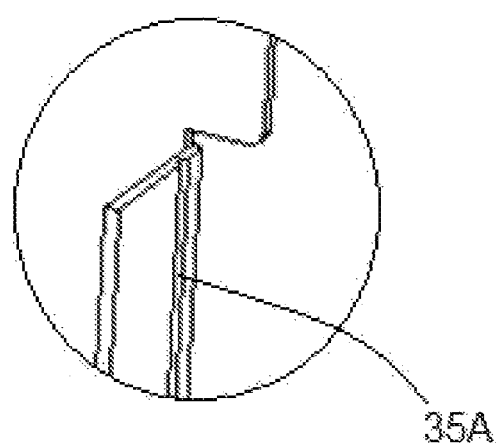
FIG. 7 is an enlarged view of Part C of FIG. 6.
Figure 8:
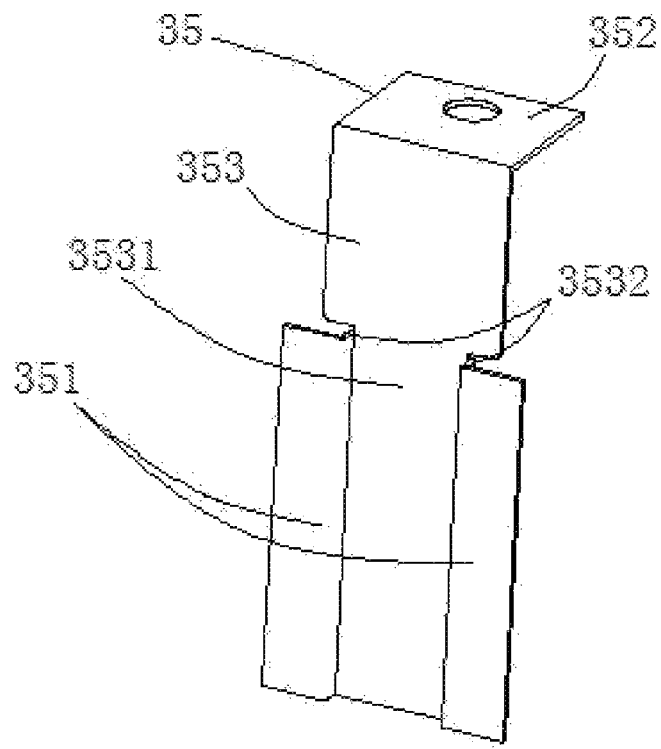
FIG. 8 is a structural schematic diagram of a connecting member of a rechargeable battery after a first connecting plate is bent with respect to a guiding plate according to an embodiment of the present disclosure.

As shown in FIG. 4 and FIG. 5, in some embodiments, in the thickness direction of the rechargeable battery, the electrode tab 120 is disposed at the outside of the guiding plate 353. The main plate body 3531 of the connecting member 35 is attached to the electrode assembly body 110. Specifically, the main plate body 3531 of the connecting member 35 is attached to the end surface of the separator at the end of the electrode assembly 100 in the longitudinal direction X. In this way, the electrode tab 120 needs to bear almost no function of fixing and positioning the electrode assembly 100 in the longitudinal direction X, and the external force can be directly transmitted from the guiding plate 353 to the electrode assembly body 110 through the protrusion, so that the electrode tab 120 can be more effectively protected from being damaged. At the same time, the electrode assembly 100 does not move with respect to the guiding plate in the longitudinal direction when vibrating, that is, the electrode tab will not be inserted into the electrode assembly body 110 because of the vibration.

In some embodiments, the first connecting plate 351 of the connecting member 35 and the electrode tab 120 of the electrode assembly 100 may be electrically connected and fixedly connected to a certain strength by ultrasonic welding, laser welding, or resistance welding. After the welding connection, by outward folding the first connecting plate 351 of the connecting member 35, the internal space occupied by the connecting member 35 and the electrode assembly 100 in the longitudinal direction X can be decreased, thereby improving the energy density. After the main plate body 3531 of the connecting member 35 is attached to the end surface of the separator of the electrode assembly 100, the electrode assembly 100 is compressed so as to support, fix and position the electrode assembly 100 along the longitudinal direction X of the electrode assembly 100, thereby preventing the electrode assembly 100 from shaking inside the case 20 after the installation of the rechargeable battery is completed.

In some embodiments, the electrode tab 120 is disposed at a side of the electrode assembly body 110 in the thickness direction, it is also possible that a position where an electrode tab 120 of one of the two electrode assemblies 100 extends from the electrode assembly body 110 is close to the other electrode assembly 100, that is, a position where the electrode tab 120 extends from the electrode assembly body 110 is at the inner side of the rechargeable battery in the width direction Y.

Figure 12:
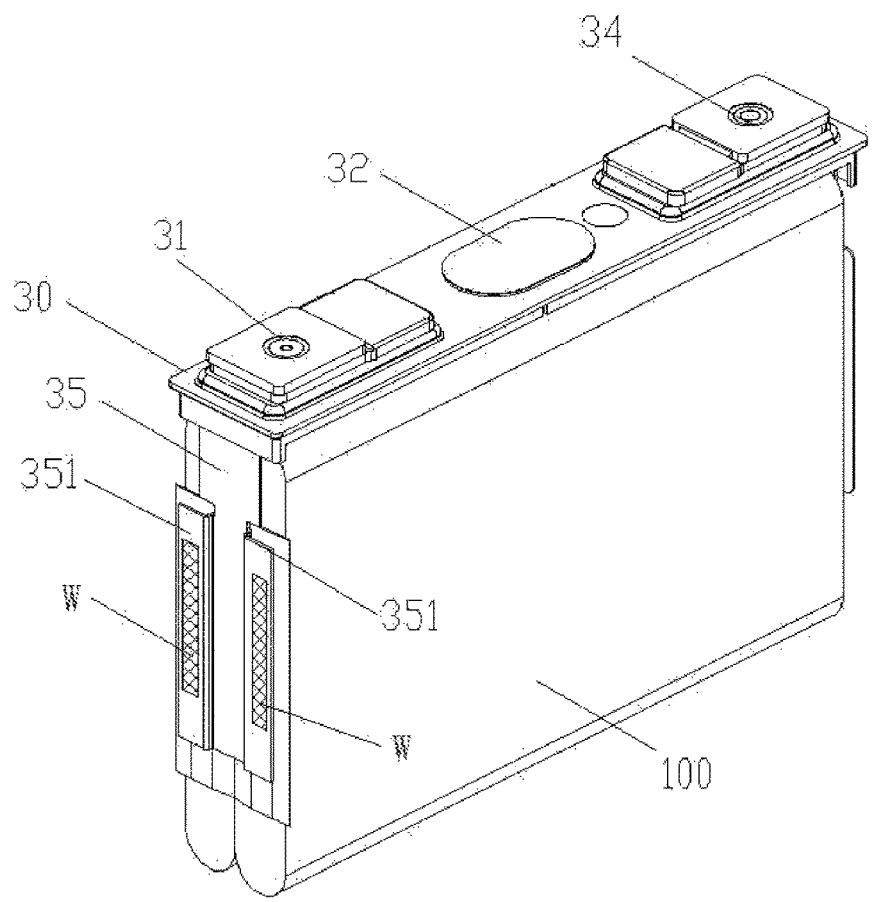
FIG. 12 is a three-dimensional schematic structural diagram of a rechargeable battery after a case is removed according to an embodiment of the present disclosure.
Figure 13:
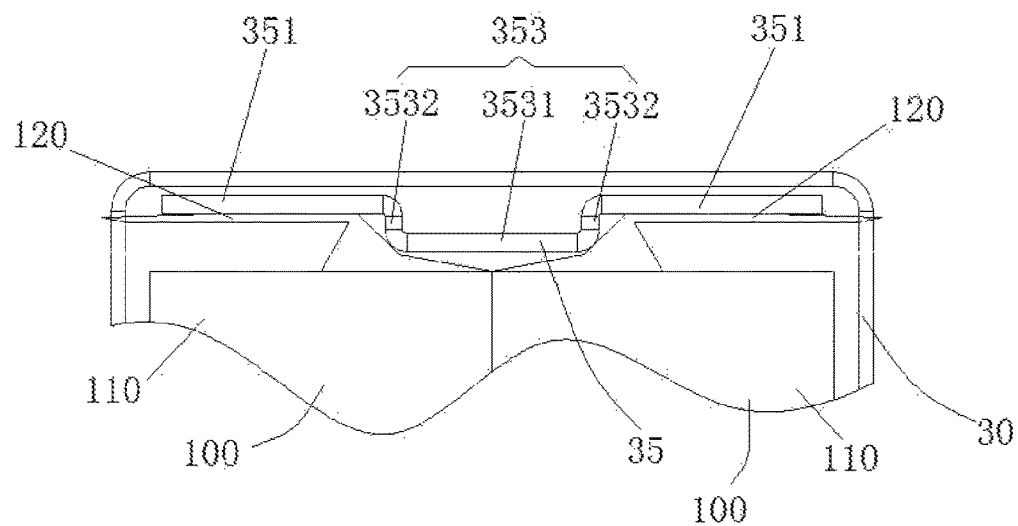
FIG. 13 is an enlarged schematic structural diagram of a part of a bottom view of the rechargeable battery according to the embodiment shown in FIG. 12.

In the embodiments shown in FIG. 12 and FIG. 13, the rechargeable battery includes an electrode assembly 100, a connecting member 35, a case, and a top cover 30. The electrode assembly 100 and the connecting member 35 are located in the installation space formed by the case and the top cover 30, and the connecting member 35 is connected to the electrode part on the top cover 30. An explosion-proof valve 32, a positive electrode part 31, a negative electrode part 34 and a liquid-injection hole are provided on the top cover 30. W shown in the accompanying drawing represents the welding position of the first connecting plate 351 with the electrode tab 120.

The structure of the connecting member 35 and the structure of the electrode assembly 100 are integrally the same as the structure of the connecting member 35 and the structure of the electrode assembly 100 in the embodiments shown in FIGS. 1-11, respectively. However, the position where the electrode tab 120 extends from the electrode assembly body 110 is located at the inner side of the rechargeable battery in the width direction Y. The main plate body 3511 of the guiding plate 351 abuts against the surface of the electrode tab 120.

As shown in FIG. 13, in some embodiments, the electrode tab 120 includes a clamped portion clamped between the protrusion of the guiding plate 353 and the electrode assembly body 110, and the clamped portion is outwardly attached to the electrode assembly body 110 along the width direction Y. As shown in FIG. 13, the position where the electrode tab 120 extends from the electrode assembly body 110 is between the guiding plate 353 and the electrode assembly body 110, and a protrusion of the guiding plate 353 protruding toward the electrode assembly 100 with respect to the first connecting plate 351 abuts against the clamped portion of the electrode tab 120. Since the clamped portion is outwardly attached to the electrode assembly body 110 along the width direction Y, the attachment between the protrusion and the electrode assembly 100 is more tight. On the one hand, this can improve the space utilization and improve the energy density of the rechargeable battery. On the other hand, when the rechargeable battery vibrates or is impacted, the electrode assembly body 110 is clamped by the protrusion of the guiding plate 353 at both ends thereof in the longitudinal direction X, so that the guiding plate 353 will bear most of the applied force. This can effectively alleviate the rapture on the electrode tab 120 caused by the vibration or impact. The movable range of the electrode tab 120 can be decreased, the possibility of electrode tab 120 being inserted into the interior electrode assembly body 110 when being pressed can be reduced, and thus the risk of a short circuit occurring inside the rechargeable battery can be decreased, so that the service life and safety performance of the electrode assembly 100 can be improved.

Please refer to relevant parts of other embodiments for details of other non-illustrated parts in the embodiment corresponding to FIGS. 12-13.

In some non-illustrated embodiments, the first connecting plate 351 of the connecting member 35 may be connected to a set of electrode assemblies 100. The number of electrode assemblies 100 in each set is not limited to one, and there may be two or more electrode assemblies 100. For example, the connecting member 35 can include two first connecting plates 351 disposed at two sides of the guiding plate 353. The rechargeable battery can include two sets of electrode assemblies 100 arranged side by side in the thickness direction. Electrode tabs of each set of electrode assemblies 100 having the same polarity are connected to one of the two first connections plates 351.

Figure 14:
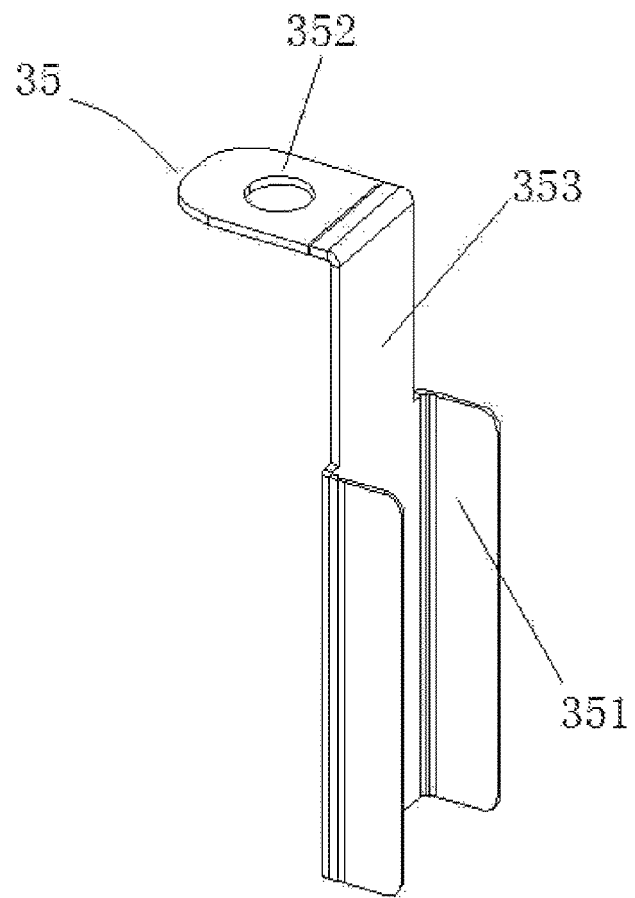
FIG. 14 is a three-dimensional schematic structural diagram of a connecting member of a rechargeable battery before a first connecting plate is bent with respect to a guiding plate according to an embodiment of the present disclosure.
Figure 15:
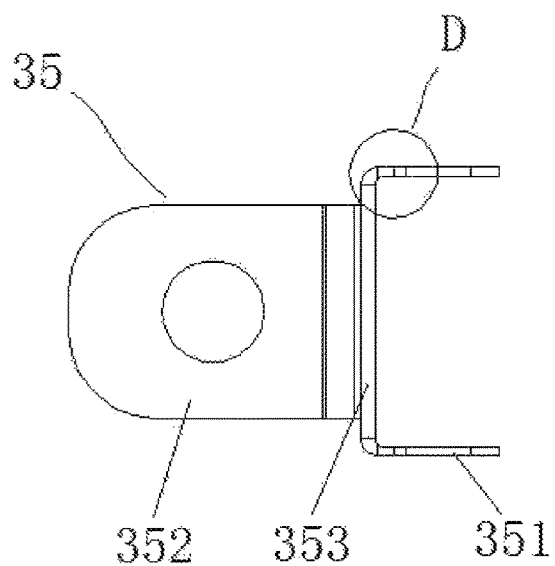
FIG. 15 is a bottom view of FIG. 14.
Figure 16:
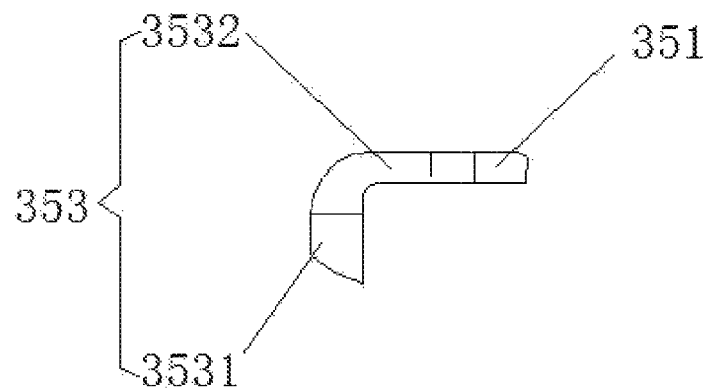
FIG. 16 is an enlarged view of Part D of FIG. 15.

In an alternative embodiment of the connecting member 35 of the rechargeable battery shown in FIGS. 14-16, the thickness of the first connecting plate 351 of the connecting member 35 is set to be smaller than the thickness of the guiding plate 353. Compared with a case in which the thickness of the guiding plate 353 of the connecting member is the same as the thickness of the first connecting plate 351, the connecting member 35 can further decrease the space of the rechargeable battery occupied by the connecting member 35 after being bent, so that the energy density of the rechargeable battery can be further improved. At the same time, since the thickness of the first connecting plate 351 is decreased, the quality of the welding installation of the first connecting plate 351 and the electrode tab 120 of the rechargeable battery can be effectively improved. The thickness of the guiding plate 353 can remain relatively large, so that the resistance of the guiding plate 353 cannot be decreased and the internal resistance of the rechargeable battery can meet the requirements, which can guarantee the electrical performance of the rechargeable battery. Moreover, the thickness of the first connecting plate 351 is smaller than the thickness of the guiding plate 353, which can facilitate the first connecting plate 351 being bent, thereby decreasing the damage on the electrode assembly body 110 or the electrode tab 120 during the bending process.

Figure 17:
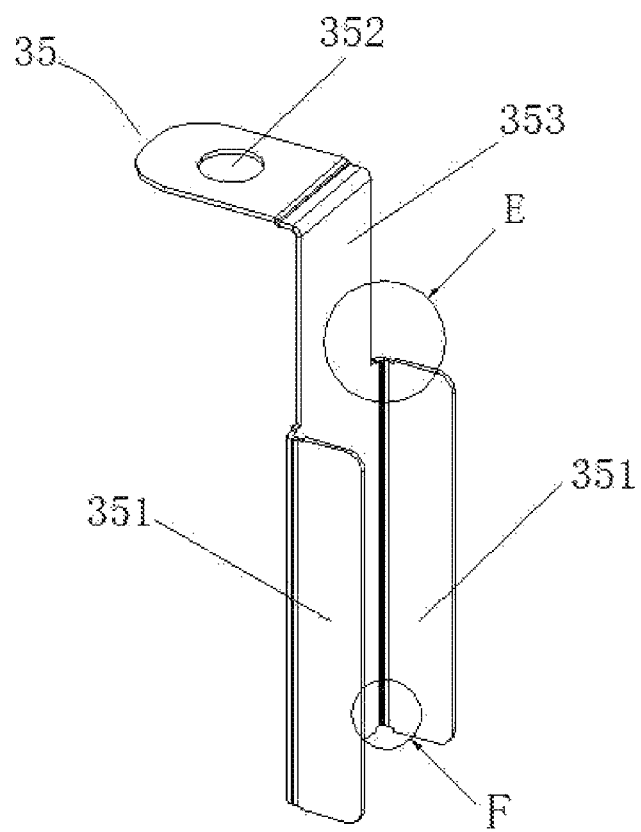
FIG. 17 is a three-dimensional schematic structural diagram of a connecting member of a rechargeable battery before a first connecting plate is bent with respect to a guiding plate according to an embodiment of the present disclosure.
Figure 18:
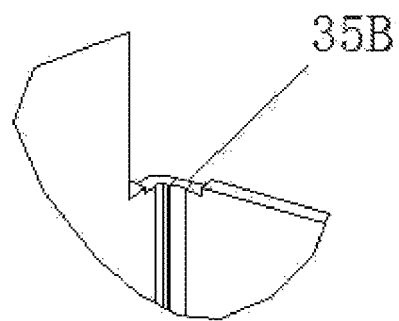
FIG. 18 is an enlarged view of Part E of FIG. 17.
Figure 19:
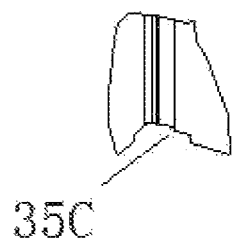
FIG. 19 is an enlarged view of Part F of FIG. 16.

In some embodiments, as shown in FIGS. 17-19, the connecting member 35 includes a first groove 35B disposed at an upper end of a connecting portion between the guiding plate 353 and the first connecting plate 351, and a second groove 35C disposed at a lower end of the connecting portion between the guiding plate 353 and the first connecting plate 351. The first groove 35B and/or the second groove 35C can make the connecting member 35 not prone to be damaged at the ends of the connecting portion during the bending process, which can effectively alleviate the cracking problem of the connecting member 35 during the bending process.

In some embodiments, the connecting member 35 includes two first connecting plates provided at two sides of the guiding plate 353, and the second connecting plate 352 is connected to the upper end of the guiding plate 353. The top ends of the connecting portions between the two first connecting plates and the guiding plate 353 begin at different heights.

Figure 20:
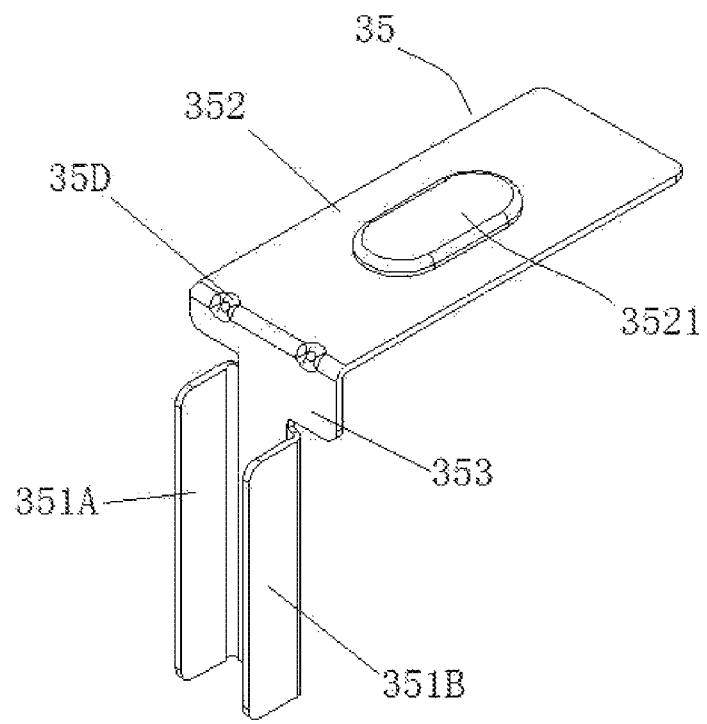
FIG. 20 is a three-dimensional schematic structural diagram of a connecting member of a rechargeable battery before a first connecting plate is bent with respect to a guiding plate according to an embodiment of the present disclosure.
Figure 21:
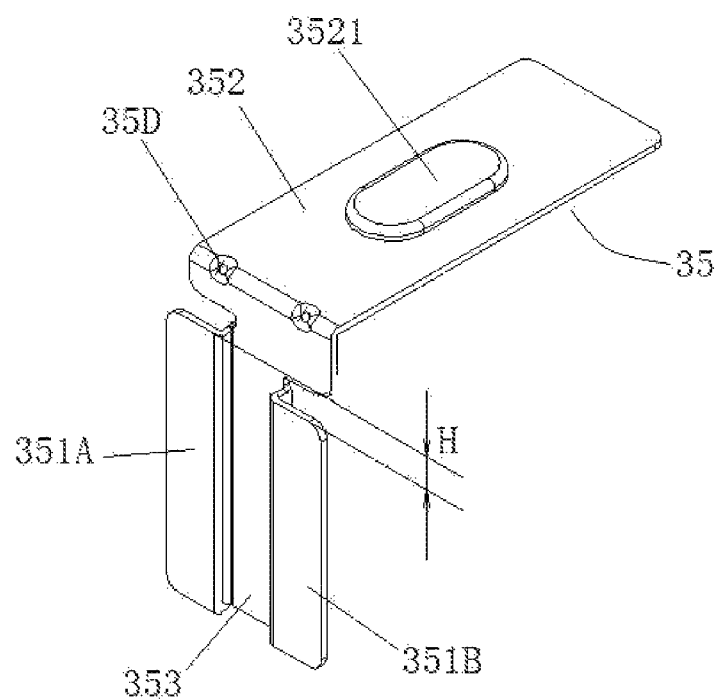
FIG. 21 is a three-dimensional schematic structural diagram of the connecting member in FIG. 20 after the first connecting plate is bent with respect to the guiding plate.

As shown in FIGS. 20-21, the connecting member 35 includes a first connecting plate 351A and a first connecting plate 351B located at two sides of the guiding plate 35. The side where the guiding plate 353 of the connecting member 35 is connected to the second connecting plate 352 is a current in-and-out side, i.e., the upper side of the connecting member 35. The top end of the connecting portion between the first connecting plate 351A and the guiding plate 353 is higher than the top end of the connecting portion between the first connecting plate 351B and the guiding plate 353. A height difference between the top end of the first connecting plate 351A and the top end of the first connecting plate 351B is H.

Due to the increasing demand for rapid charging of the rechargeable battery, the connecting member 35 needs to have a large overflow area. Since the first connecting plate 351 needs to be bent, the connecting portion of the guiding plate 353 with the first connecting plate 351 has a limited width, which, in some cases, can only be set as small. There will be a necking in the current transmission path of the connecting member 35. The necking may be a region with a narrow cross section. If the top ends of the first connecting plates located at the two sides of the guiding plate 35 have a same starting height, the size of the necking is the width size of the main plate body. If the top ends of the two first connecting plates have different starting heights, the size of the necking can be defined by connection lines between two ends of the main plate body in the width direction and height points corresponding to the two first connecting plates, which can enlarge the overflow area of the guiding plate 353 and improve the safety performance of the rechargeable battery.

As shown in FIG. 20 and FIG. 21, in some embodiments, the guiding plate 353 and the second connecting plate 352 of the connecting member 35 are integrally formed by bending a sheet material, and at least one convex portion 35D is provided at the bending portion of the guiding plate 353 with the second connecting plate 352. The convex portion 35D allows the guiding plate 353 and the second connecting plate 352 to be easily kept in relative positions when the first connecting plate 351 is bent, so that relative positions of components (such as the electrode assembly, the top cover, the case and the like) connected to the connecting member 35 are correct and unified when the rechargeable battery is being installed, which is beneficial to successful installation work, and also beneficial to improving the quality of the rechargeable battery. Moreover, when the rechargeable battery vibrates or is impacted, the convex portion 35D helps to guarantee the relative positions of the guiding plate 353 with the second connecting plate 352, thereby facilitating protecting the electrode tab 120. In this embodiment, two convex portions 35D are provided uniformly along the bending portion of the guiding plate 353 with the second connecting plate 352.

In the connection structure shown in FIG. 20 and FIG. 21, the second connecting plate 352 is connected to the electrode part of the rechargeable battery through the welding portion 3521 provided on the second connecting plate 352.

Figure 22:
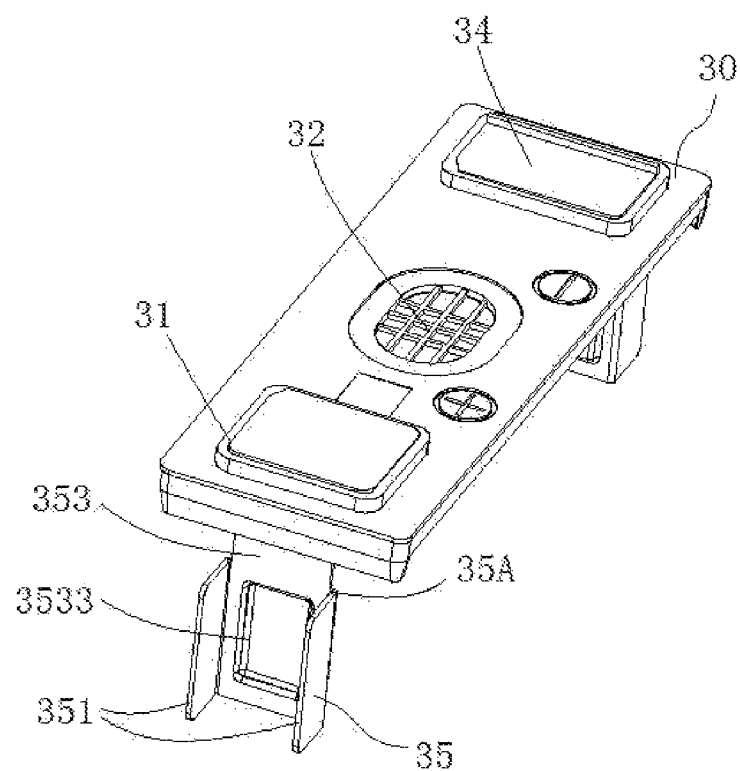
FIG. 22 is a schematic structural diagram of a connection structure of a connecting member with a top cover of a rechargeable battery according to an embodiment of the present disclosure.
Figure 23:
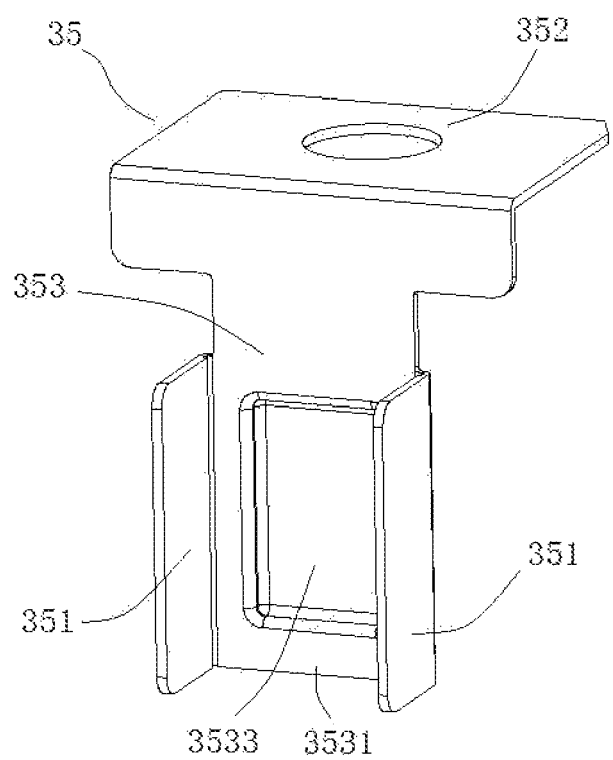
FIG. 23 is a three-dimensional schematic structural diagram of the connecting member in FIG. 22 before a first connecting plate is bent with respect to a guiding plate.
Figure 24:
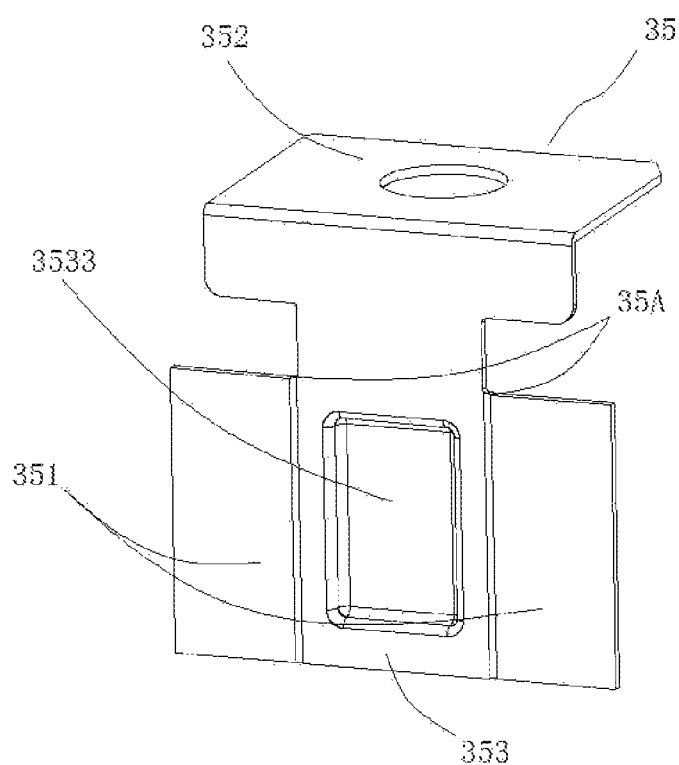
FIG. 24 is a three-dimensional schematic structural diagram of the connecting member in FIG. 22 after a first connecting plate is bent with respect to a guiding plate.

In some embodiments, as shown in FIGS. 22-24, the connecting member 35 of the rechargeable battery includes a guiding plate 353, two first connecting plates 351 respectively connected to two side edges of the guiding plate 353 in the width direction Y, and a second connecting plate 352 connected to the top end of the guiding plate 353. The guiding plate 353 includes a main plate body 3531 and a boss 3533 provided on the main plate body 3531 and protruding toward the electrode assembly body 110. The boss 3533 forms the aforementioned protrusion, and the first connecting plate 351s are connected to the main plate body 3531.

When the boss 3533 is press-molded integrally with the main plate body 3531, a notch is formed at the back side (i.e., the side facing away from the electrode assembly 100) of the boss 3533.

With reference to FIGS. 22-24, there is only one boss 3533, the cross-sectional shape of the boss 3533 is a square, and edges of the bosses 3533 are respectively parallel to the width direction Y and the height direction Z. In the height direction Z of the connecting member 35, the top end of the boss 3533 is lower than the top end of the first connecting plate 351, the bottom end of the boss 3533 is higher than the bottom end of the first connecting plate 351, and the bottom surface of the boss 3533 is a flat plate.

In the case where the boss is provided on the guiding plate 353, various modifications can be made to the structure of the boss. For example, the number of the boss is not limited to one, but there may be more bosses, and the bosses are preferably arranged in an array, for example, the bosses may be sequentially arranged in the height direction of the connecting member 35. The cross-sectional shape of the boss is not limited to a square, but may be an oblong. The position of the boss is not limited to be between the top end and the bottom end of the first connecting plate, but can be configured in such a way that the top end of the boss is higher than the top end of the first connecting plate or the bottom end of the boss is lower than the bottom end of the first connecting plate. It is also possible that the boss can be integrally set as higher than the top end of the first connecting plate or lower than the bottom end of the first connecting plate. The bottom surface of the boss is not limited to a flat plane, but may be for example an arc-shaped surface.

In the case where there is a boss provided on the guiding plate 353, after being bet, the first connecting plate 351 can be disposed to be substantially aligned with the main plate body 3531 of the guiding plate 353.

Based on the rechargeable battery provided by the present disclosure, since the first connecting plate extends away from the guiding plate in the width direction, the electrode tab is bent with respect to the longitudinal direction and is connected to the first connecting plate. Compared with the prior art in which the first connecting plate is parallel to the longitudinal direction of the electrode assembly, the space occupied by the first connecting plate and the electrode tab in the longitudinal direction can be decreased and the space utilization of the electrode assembly can be increased, so that the energy density of the rechargeable battery can be improved. Further, since at least a part of the guiding plate protrudes toward the electrode assembly body with respect to the first connecting plate to form a protrusion, which abuts against the electrode assembly, when the rechargeable battery vibrates or is impacted, the guiding plate 353 will bear most of the applied force, which can effectively alleviate the rupture of the electrode tab caused by the vibration or impact, so that the service life and safety performance of the electrode assembly can be improved. Further, the movable range of the electrode tab is decreased and the possibility of electrode tab being inserted into the electrode assembly body after being pressed is decreased, and thus the risk of a short circuit occurring inside the rechargeable battery can be decreased, thereby facilitating improving the service life and safety performance of the electrode assembly.

In the above-mentioned embodiments of the present disclosure, as long as no conflict occurs, the related content of different embodiments may be referred to or combined with each other.

Finally, it should be noted that, the above-described embodiments are merely for illustrating the present disclosure but not intended to provide any limitation. Although the present disclosure has been described in detail with reference to the preferred embodiments, it should be understood by those skilled in the art that, it is still possible to modify the technical solutions described in the above embodiments or to equivalently replace some of the technical features therein, but these modifications or replacements do not cause the corresponding technical solutions to depart from the scope of the present disclosure.

What is claimed is:

1. A rechargeable battery, comprising an electrode assembly and a connecting member, wherein the electrode assembly comprises an electrode assembly body and an electrode tab extending from an end surface of the electrode assembly body, the connecting member comprises a guiding plate, a first connecting plates and a second connecting plate respectively connected to the guiding plate, wherein the guiding plate extends along a width direction, the first connecting plates extends away from the guiding plate along the width direction and is located at a side of the guiding plate in the width direction, the second connecting plate is connected to an upper end of the guiding plate and extends along a longitudinal direction, the electrode tab is bent with respect to the longitudinal direction to form a bending part, and the bending part of the electrode tab is connected to the first connecting plate;

the guiding plate comprises a main plate body and a flanging portion, the flanging portion is located at a lateral edge of the main plate body in the width direction and extends in a direction away from the electrode assembly, the first connecting plate is connected to the main plate body by the flanging portion, and the main plate body abuts against the end surface of the electrode assembly body;

the width direction is to a thickness direction of the rechargeable battery, and the longitudinal direction is to a length direction of the rechargeable battery.

2. The rechargeable battery according to claim 1, wherein the connecting member is integrally formed by a sheet material, and a notch is formed between the first connecting plates and the guiding plate.

3. The rechargeable battery according to claim 1, wherein the first connecting plates has a thickness smaller than that of the guiding plate.

4. The rechargeable battery according to claim 1, wherein the first connecting plate is foldable with respect to the guiding plate, and a bending portion between the first connecting plates and the guiding plate comprises a first root portion and a second root portion respectively located at opposite ends thereof, wherein a first groove is provided at the first root portion and disposed between the first connecting plate and the guiding plate, and/or a second groove is provided at the second root portion and disposed between the first connecting plate and the guiding plate.

5. The rechargeable battery according to claim 1, wherein the guiding plate and the second connecting plate are integrally formed by bending a sheet material, and at least one convex portion is provided at a bending portion between the guiding plate and the second connecting plate.

6. The rechargeable battery according to claim 1, wherein in the width direction, the electrode tab extends from one part of the end surface of the electrode assembly body, and the other part of the end surface of the electrode assembly body is not provided with the electrode tab.

7. The rechargeable battery according to claim 6, wherein the one part of the end surface of the electrode assembly body is located at a side of the guiding plate in the width direction, and the guiding plate abuts against the other part of the end surface of the electrode assembly body.

8. The rechargeable battery according to claim 7, wherein the connecting member comprises two first connecting plates respectively connected to two sides of the guiding plate in the width direction, the rechargeable battery comprises two sets of electrode assemblies arranged side by side along the width direction, and electrode tabs of each set of electrode assemblies having a same polarity are connected to one of the two first connecting plates.

9. The rechargeable battery according to claim 1, wherein the connecting member comprises two first connecting plates respectively connected to two sides of the guiding plate in the width direction, and starting heights of top ends of connecting portions between the two first connecting plates and the guiding plate are different from each other.

10. The rechargeable battery according to claim 8, wherein each set of electrode assemblies comprises one electrode assembly, the electrode tab of which extends in the width direction from a side of the electrode assembly body away from the other set of electrode assemblies, and the other parts of the two sets of electrode assemblies are adjacent to each other.

11. The rechargeable battery according to claim 10, wherein in the width direction, at least a part of the guiding plate is located between two electrode tabs that are arranged at a same side of one of the two sets of electrode assemblies.

12. The rechargeable battery according to claim 1, wherein the main plate body and the flanging portion form a protrusion.

* * * * *